United States Patent [19]

Aldenhoven

[11] Patent Number: 4,660,109

[45] Date of Patent: Apr. 21, 1987

[54] MECHANISM FOR ACTUATING THE RECORDING SWITCH OF A MAGNETIC-TAPE APPARATUS

[75] Inventor: Ghislanus M. A. M. Aldenhoven, Eindhoven, Netherlands

[73] Assignee: U.S. Philips Corporation, New York, N.Y.

[21] Appl. No.: 679,189

[22] Filed: Dec. 7, 1984

[30] Foreign Application Priority Data

Dec. 15, 1983 [NL] Netherlands ........................ 8304313

[51] Int. Cl.$^4$ ............................................. G11B 15/18
[52] U.S. Cl. ..................................... 360/96.3; 360/96.1
[58] Field of Search ............................... 360/96.3, 96.1

[56] References Cited

U.S. PATENT DOCUMENTS 4,301,483 11/1981 Santoro .............................. 360/96.3
4,468,711 8/1984 Schoenmakers et al. .......... 360/96.3
4,564,873 1/1986 Hashimoto et al. ........... 360/96.3 X Primary Examiner—A. Michael Chambers
Assistant Examiner—John C. Fox
Attorney, Agent, or Firm—David R. Treacy

[57] ABSTRACT

A mechanism for providing actuating force on a switch responsive to changes in operation of a drive motor and the position of the head-mounting plate. An axially displaceable coupling wheel engages a guideway surface on the head-mounting plate, for movement axially between a position in which the coupling wheel engages an idler gear which is used to provide fast forward and fast reverse driving, and a position in which the coupling wheel is disengaged from the idler. The coupling wheel drives a servo wheel which is limited to one direction of rotation by a pawl, and is connected to a recording switch by an actuating link.

11 Claims, 3 Drawing Figures

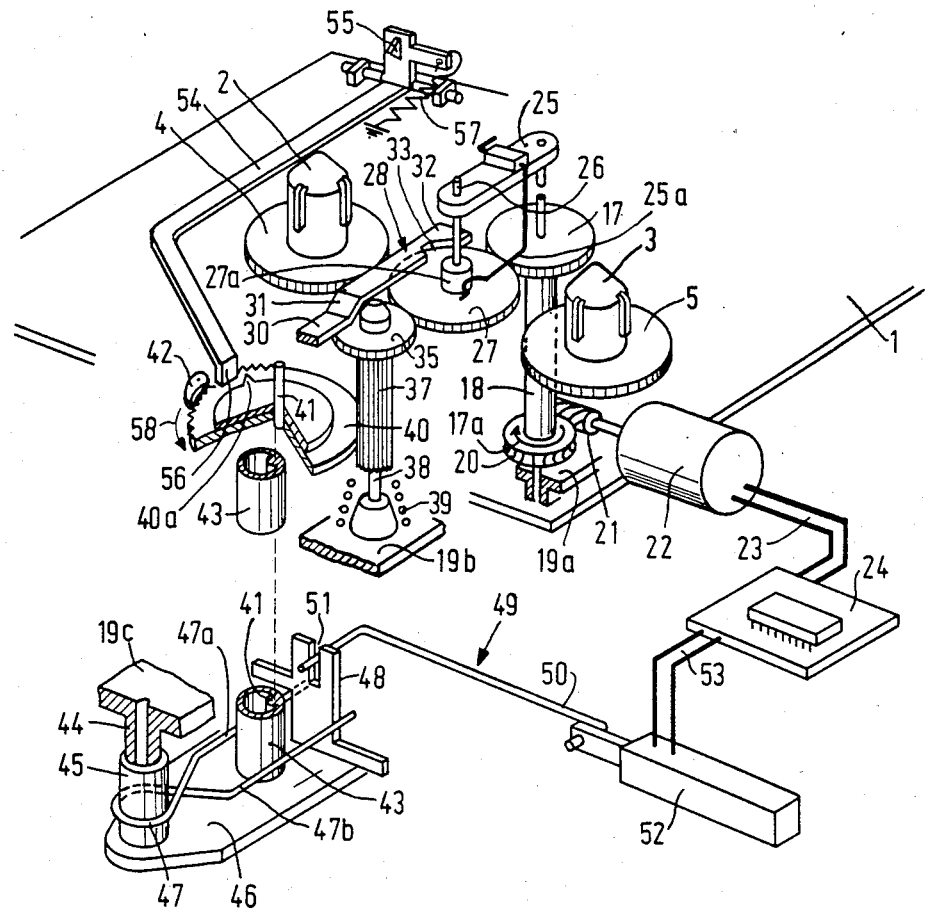
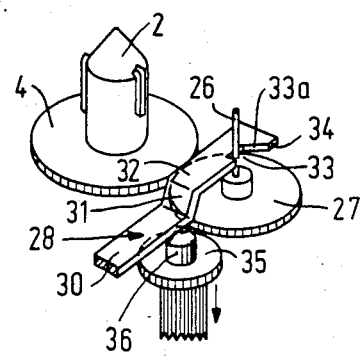
FIG.2
FIG.3

MECHANISM FOR ACTUATING THE RECORDING SWITCH OF A MAGNETIC-TAPE APPARATUS

The invention relates to a switching mechanism in a magnetic-tape apparatus for actuating the recording switch. Such apparatus has a head-mounting plate which carries a magnetic head and is movable between at least two positions, and two winding spindles each coaxially connected at its lower end to an associated reel disc, and an idler wheel which is driven by a drive means and which is pivotally supported between the reel discs so as to be displaceable into engagement with either disc to transmit drive thereto in an operating position of the head-mounting plate. The head-mounting plate also carries two abutments which, in a rest position of the head-mounting plate, limit the displacement of the idler wheel so as to keep the idler wheel disengaged from the reel discs in the rest position of the head-mounting plate.

Such a mechanism is generally known and constitutes the connection between a recording button of the apparatus and the electrical recording switch. For mechanical actuation of the recording switch in such an apparatus manual force must be applied. This is undesirable in particular with recently developed apparatuses in which the various functions such as playing and fast winding are controlled with easy-to-actuate buttons (so-called touch controls) by a microprocessor circuit. Consequently, the recording switches in recently developed magnetic tape apparatuses are actuated by means of a switching device in the form of a separate servo motor or other power source. This extra motor adds to the price of the apparatus.

SUMMARY OF THE INVENTION

The object of the invention is to provide such a switching mechanism which can utilize a standard power source of the magnetic-tape apparatus.

To this end the invention is characterized in that the switching mechanism includes a guideway on the head mounting plate, and an axially displaceable coupling wheel which is moved by the guideway between a first position in which the coupling wheel is coupled to the idler wheel when the head-mounting plate is in the rest position, and a second position in which the coupling wheel is disengaged from the idler wheel when the head-mounting plate is in the operating position. A servo wheel is driven by the coupling wheel. A latching element locks the servo wheel against rotation in one direction. The servo wheel operates the recording switch of the switching device through an actuating link.

Thus, when the head-mounting plate is in the rest position, the switching device according to the invention can be driven by the drive means normally used for the fast winding of the magnetic-tape apparatus. In this rest position the head-mounting plate prevents the idler wheel and the fast-wind reel discs from being coupled to each other. This position of the head-mounting plate, in which the coupling wheel is in the first position and is coupled to the idler wheel, ensures a correct drive of the servo wheel and hence correct actuation of the recording switch by the coupling wheel. The locking of the servo wheel against rotation in one direction guarantees a stable switched position of the recording switch after actuation. In the operating position of the head-mounting plate the guideway ensures that the coupling wheel is disengaged from the idler wheel, so that in the operating position of the head-mounting plate the servo wheel is disengaged in a reliable manner and fast winding is not impeded.

A preferred embodiment of the invention is characterized in that the servo wheel carries a cam which is situated between two resilient limbs of a wire spring of the actuating link. This link comprises an upright member which is coupled to the recording switch and which is also situated between the limbs of the spring. This enables tolerances in transmission between the servo wheel and the recording switch to be compensated for, and in the switched position allows a certain pre-load to be exerted on the switch to ensure that the switch is in the correct position during recording.

Yet another preferred embodiment of the invention is characterized in that the coupling wheel is rigidly connected to a spindle, an end portion of which is urged axially against the guideway under spring force. Thus, by means of only a few additional parts a correct coupling and disengagement of the servo wheel and the idler wheel is achieved. Moreover, this enables the instant at which the idler wheel begins to drive the servo wheel to be defined accurately.

In this respect a further preferred embodiment of the invention is characterized in that the switch is electrically connected to a microprocessor circuit which controls the motor of the drive means in such a way that this motor is stopped some time after the switch has been actuated, so that due to a continued movement of the servo wheel the switch is latched in the relevant final switched position by the spring load exerted by the limbs of the wire spring. Thus, at the instant of switching the switch can give a signal to the microprocessor circuit, which may be programmed so as to allow the motor to run on for some time. The advantage of this construction is that any tolerances in the switching device can be compensated for effectively. Thus, during manufacture of the magnetic-tape apparatus it is not necessary to carry out a special adjustment of the switching device and, in particular, its coupling to the recording switch.

Another preferred embodiment of the invention is characterized in that a sensing means is provided which acts to block the servo wheel and render it inoperative upon detection of an anti-erase opening in a magnetic-tape cassette. Thus, the switching device can be disabled effectively when a magnetic-tape cassette which is not intended for recording is inserted into the apparatus. Since the servo wheel is not set in rotation the recording switch is not changed over. The maintained switch position is detected by the microprocessor circuit which subsequently stops the drive motor for the idler wheel.

An embodiment of the invention will be described in more detail, by way of example, with reference to the drawing.

BRIEF DESCRIPTION OF THE DRAWING

FIG. 2 is an exploded perspective view of part of this apparatus showing the switching device during actuation of the recording switch;

FIG. 3 is a perspective view of the idler wheel driving one of the reel discs when the switching device is inoperative.

DESCRIPTION OF THE PREFERRED EMBODIMENT

Figure 1:
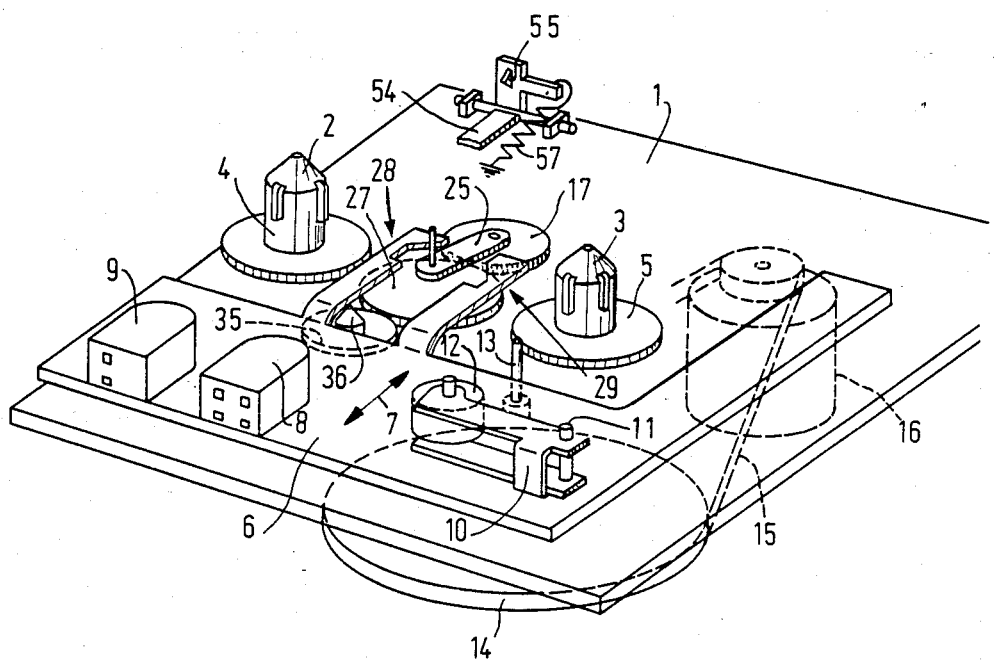
FIG. 1 is a perspective view of part of a magnetic-tape apparatus provided with a switching device in accordance with the invention.

The magnetic-tape-cassette apparatus shown in FIG. 1 comprises a deck plate 1, in which two winding spindles 2 and 3 are mounted for rotation. At its lower end each of the winding spindles 2 and 3 is coaxially fixed to a winding gear 4 and 5, respectively. A head-mounting plate is guided on the deck plate 1 for rectilinear movement in the directions indicated by the double arrow 7. In the rest position shown in FIG. 1, the head-mounting plate 6 is retracted relative to the winding spindles. From this position the plate 6 can be moved to at least one operating position in which it is situated nearer the winding spindles.

The head-mounting plate 6 carries two magnetic heads 8 and 9, which in the present embodiment are a combined recording/play-back head and an erase head respectively. Further, the head-mounting plate 6 also carries a pressure-roller level 10 which is pivotable at one end about a spindle 11 which is secured to the upper side of the deck plate 1. At its other end the pressure-roller lever carries a pressure roller 12 which, in an operating position (not shown) of the head-mounting plate, acts against a capstan 13. The capstan 13 is journalled in the deck plate 1. Underneath the deck plate the capstan is connected to a fly-wheel 14 which is driven by a drive motor 16 through a belt 15. In a manner not shown the drive motor 16 can move the head-mounting plate 6 between its various positions.

Near the space between the reel discs 4 and 5 a drive gear 17 is arranged on the deck plate 1. The gear 17 is fixed on a spindle 18 which is mounted for rotation in a bearing support 19a which is rigidly connected to the deck plate 1. Between the drive gear 17 and the bearing support 19a a worm wheel 20 is fixed on the spindle 18, and meshes with a worm 21 driven by a winding motor 22. By means of electrical connecting wires 23 the winding motor 22 is connected to a microprocessor circuit 24, by which the motor can be switched on and off and its direction of rotation can be reversed. A pivotal arm 25 is pivotally mounted at one end on the spindle 18 above the drive wheel 17. At its other end the arm 25 carries a spindle 26 on which an idler gear 27 is journalled. The idler gear 27 meshes with the drive gear 17, and lies in the space beteen the winding gears 4 and 5. On the pivotal arm 25 a friction spring 25a is arranged having a free end which bears against a collar 27a on the gear 27. The spring 25a controls the pivotal movement of the arm 25 by the friction torque exerted on the collar 27a at the instant at which the direction of rotation of the motor 22 is reversed. Thus, by the pivotal movement of the pivotal arm 25 around the spindle 18 the idler gear 27 can be coupled to the winding gear 4 or the winding gear 5 in order to drive the relevant spindle. The direction of the pivotal movement depends on the direction of rotation of the motor 22. Thus, when a magnetic-tape cassette has been inserted into the magnetic-tape apparatus, the magnetic tape contained in the cassette can be wound rapidly by the winding motor 22 through the winding spindle 2 or 3.

Projecting from the head-mounting plate 6 on opposite sides of the spindle 26 are two substantially parallel limbs 28 and 29 which are constructed and arranged mirror-symmetrically relative to a plane which lies midway between them and which is perpendicular to the deck plate 1 and parallel to the arrow 7. The limb 28 only will be described with reference to FIG. 3. The limb 28 comprises portions 30 and 32 which extend substantially parallel to the deck plate 1, and are connected by a portion 31 which is upwardly inclined relative to the deck plate 1. The portion 30 adjoins the head-mounting plate 6 and the portion 32 is spaced further from the deck plate 1 than the portion 30. In its side which faces the spindle 26, the portion 32 has a recess 33 having a wall 33a which is inclined relative to the direction of movement of the head-mounting plate 6 and which adjoins an abutment surface 34 of the portion 32. The surface 34 extends between the recess 33 and the free end of the portion 32, and in a manner to be described hereinafter constitutes an abutment for the spindle 26.

When the head-mounting plate 6 has been moved towards the winding spindles 2 and 3 into the fast-winding position, the limbs 28 and 29 each occupy a position (the position shown for the limb 28 in FIG. 3) such that the spindle 26 can move freely into the recess 33 in one or the other of the limbs by pivotal movement of the pivotal arm 25 in the relevant direction. This enables the idler gear 27 to be coupled to the winding gear 4 or the winding gear 5 without being obstructed by the limbs 28 or 29, for fast-winding in a direction which depends on the direction of rotation of the motor 22.

In the rest position of the head-mounting plate the abutment surface 34 of each limb 28 and 29 functions as a stop to limit the movement of the idler gear 27 with the arm 25 about the axis of the spindle 18. Thus, in the rest position of the head-mounting plate the idler wheel 27 is always disengaged from both of the winding gears 4 and 5. In the rest position of the head-mounting plate 6 an axially displaceable coupling gear 35 is located near the space between the winding gears 4 and 5 and occupies a position in which the idler gear 27 can be coupled to the coupling gear 35. This is effected by the motor 22 causing the drive wheel 17 to rotate in the direction indicated by the arrow 17a in FIG. 2, so that the idler gear 27 is swung towards the limb 28 and the spindle 26 abuts the abutment surface 34 of the limb.

A conical axial projection 36 on the upper side of the coupling gear 35 has sliding contact with a guideway constituted by the lower surfaces of the portions 30 and 31 of the limb 28. This guideway displaces the coupling gear 35 axially downwards out of engagement with the idler gear 27 when the head-mounting plate is shifted from the rest position to an operating position as shown in FIG. 3. The projection 36 constitutes an end portion of a splined shaft 37 which carries the coupling gear 35 and which is slidably journalled on a spindle 38 arranged on a support 19b which is connected to the deck plate 1. A compression spring 39 arranged between the support 19b and the splined shaft 37 urges the shaft 37 and hence the coupling gear 35 axially upwards. The splined shaft 37 meshes with a toothed servo gear 40 which is rotatably supported in the deck plate 1 by means of a spindle 41. The teeth of the servo gear 40 cooperate with a pawl 42 which constitutes a latching element for locking the servo gear 40 against rotation in one direction. The spindle 41 carries a cylindrical cam 43 which extends downwardly from the servo gear 40 and is rigidly connected thereto and which is arranged eccentrically of the spindle 41. The deck plate 1 carries a support 19c having a downwardly extending shaft 44 on which is rotatably mounted a sleeve 45 which is rigidly connected to a horizontally extending member 46 located below the cam 43. The central portion of a wire spring 47 of the hairpin type is fitted around the sleeve 45. The spring 47 has two substantially parallel limbs 47a and 47b between which pass on opposite sides of the cam 43. Near their free ends the limbs bear against two opposite upright edges of an upright member 48 which is rigidly connected to the member 46. The member 46 with the member 48 forms part of a switch-actuating means 49 which also comprises an L-shaped rod 50 whose shorter limb engages in a slot 51 in the upright member 48 and whose other limb is connected to a recording switch 52. In this way the recording switch can be changed over between an inoperative position and a recording position by the actuating means 49. The recording switch 52 is connected to the microprocessor circuit 24 by electrical connecting wires 53.

The deck plate 1 further carries a sensing means comprising an arm 54 which is pivotable in upward and downward directions and which has a hook-shaped sensing portion 55 at one end and a portion 56 at the other end which is directed downwardly towards the servo gear 40. A spring 57 urges the arm 54 downwardly to bring the end portion 56 of the arm into the path of a stop 40a on the upper side of the servo gear 40, so that the servo gear cannot rotate any further after abutment of the stop 40a with the end portion 56.

When a magnetic-tape cassette has been inserted and fast-winding of the tape is required, the motor 22 is started by pressing a button, not shown, and subsequently the head-mounting plate 6 is moved towards the winding spindles 2 and 3 into a first operating position. For this reference is made to the preceding part of the description.

When a recording button, not shown, is pressed the head-mounting plate 6 does not move out of the rest position and the coupling gear 35 occupies the position for meshing with the idler gear 27. This gear is driven by the motor 22, which has been started by the depression of the recording button. When the idler gear 27 and the coupling gear 35 mesh with each other the coupling gear 35 causes the servo gear 40 to rotate in the direction indicated by the arrow 58 in FIG. 2. At this instant the recording switch 52 is changed over by a switching device comprising the coupling gear 35, the splined shaft 37, the servo gear 40, the cam 43, the wire spring 47, and the switch-actuating means 49. This is achieved by the rotation of the servo gear 40 urging the cam 43 against the limb 47b of the spring 47 to deflect this limb away from the member 48 of the switch-actuating means 49. The pre-stress of the spring 47 causes the other limb 47a to press against the member 48 and move this member and with it the rod 50 to set the switch 52 to the recording position. Once the switch 52 has been actuated a pilot lamp, not shown, may light up to indicate that a recording is being made. The change-over of the switch 52 to the recording position is detected by the micro-processor circuit 24 through the electrical connection 53. The circuit 24 subsequently allows the drive motor 22 to run on briefly in the relevant direction. The time during which the motor 22 continues to rotate is defined by the circuit 24. As a result of this the servo gear 40 continues to rotate slightly further in the direction indicated by the arrow 58, so that the limbs 47a, 47b of the wire spring 47 are moved slightly apart and firmly keep the switch in the switched position under spring load. Subsequently, the microprocessor circuit 24 causes the motor 22 to stop, the pawl 42 ensuring that the switch is kept firmly in the switched position. Now the magnetic-tape apparatus is in the recording stand-by position. This construction has the advantage that any tolerances in the transmission between the servo gear 40 and the switch 52 are compensated for effectively. As a result of this no additional adjustments are required during manufacture of the magnetic-tape apparatus.

For starting the tape transport in order to make a recording on the tape a start button, not shown, is pressed. As a result of this the head-mounting plate is moved from the rest position to a second operating position in which it is situated at a smaller distance from the winding spindles 2 and 3 than in the first operating position (fast-winding), and in which the spindle 26 cannot enter the recesses 33 and the pressure roller 12 acts against the capstan 11. Subsequently, the circuit 24 starts the motor 22 but now in a direction opposite to that in which it rotates during actuation of the recording switch 52. As a result the drive gear 17 is rotated in the opposite direction to that indicated by the arrow 17a in FIG. 2. A transmission, not shown, between the gear 17 and the winding spindle 3, drives the winding spindle 3. Since in the meantime the motor 16 has been started, recording may commence.

It is to be noted that the recording button and the start button may be actuated simultaneously, in which case the microprocessor circuit 24 first performs the recording stand-by operation described in the foregoing and immediately after this the start operation. Recording is terminated by pressing a stop button, not shown. Upon every actuation of this stop button the circuit 24 first ascertains whether the switch 52 is in the recording position. This is the case because a recording has been made, so that the head-mounting plate 6 is now returned to the rest position and the direction of rotation of the motor 22 reversed, under the control of the circuit 24, after which the gear 17 is rotated in the direction indicated by the arrow 17a. During the return movement of the head-mounting plate the idler gear 27 has been brought into mesh with the coupling gear 35, so that the recording switch 52 is set to the other inactive position by the servo gear 40.

A so-called anti-erase opening in the rear wall of the magnetic-tape cassette can be scanned by the sensor 55, so that the end portion 56 of the member 54 is moved towards the servo gear 40. The end portion 56 is then situated in the path of the stop 40a so as to prevent rotation of the servo gear 40. After a short time the microprocessor circuit 24 signals that the switch 52 is not being actuated. Because of this interaction with the microprocessor circuit, the motor 22 is switched off immediately after this. Thus, if the cassette has an anti-erase opening, actuation of the recording button will not result in a recording being made.

The switching device in accordance with the invention enables the recording switch to be actuated by means of a standard power source in a magnetic-tape apparatus. Thus, so-called touch control of the recording switch is possible, which is advantageous in conjunction with other easy-to-actuate buttons of a magnetic-tape-apparatus.

What is claimed is:

1. A magnetic-tape apparatus having a switch-actuating mechanism, comprising
    a deck plate on which a head-mounting plate is mounted to be movable between at least a rest position and an operating position, a magnetic head carried on said head-mounting plate, two winding spindles, for transporting tape past said head, each spindle having a respective reel disc coaxially connected thereto, drive means for selectively driving a selected one of said winding spindles, comprising an idler wheel pivotally supported between said reel discs so as to be displaceable into engagement with one of said discs when said head mounting plate is in the operating position, two abutments carried on said head-mounting plate, arranged to limit displacement of the idler wheel when the head-mounting plate is in the rest position so as to keep the idler wheel disengaged from said reel discs, a recording switch, and actuating means for actuating said switch, characterized in that the switching mechanism comprises a guideway on the head mounting plate, an axially displaceable coupling wheel, displaceable between a first position in which the coupling wheel is coupled to the idler wheel when the head-mounting plate is in the rest position, and a second position in which the coupling wheel is disengaged from the idler wheel when the head-mounting plate is in the operating position, a servo wheel arranged to be driven by said coupling wheel, and a latching element arranged to engage said servo wheel to prevent rotation of the servo wheel in one direction; and said actuating means comprises means engaging said servo wheel for operating said recording switch.

2. An apparatus as claimed in claim 1, characterized in that said actuating means further comprises a wire spring having two resilient limbs, and an upright member which is coupled to the recording switch and is disposed between said limbs, and said mechanism includes a cam connected to and rotating with said servo wheel, disposed between said limbs.

3. An apparatus as claimed in claim 2, characterized by comprising a spindle having an end portion, said spindle being rigidly connected to said coupling wheel, and means for applying an axial spring force to said spindle for urging said spindle axially against said guideway.

4. An apparatus as claimed in claim 3, characterized in that said drive means comprises a motor, and said apparatus comprises a microprocessor for controlling said motor, said switch being electrically connected to said microprocessor, and said microprocessor controlling said motor such that after said switch has been actuated there is a given time delay following which said motor is stopped, the continued operation of said motor moving said servo wheel to a position in which the switch is latched in a final switch position by the spring load exerted by said limbs.

5. An apparatus as claimed in claim 4, for recording information upon magnetic tape contained in a magnetic tape cassette, characterized in that said apparatus comprises means for sensing the presence or absence of an anti-erase opening in a cassette inserted in the apparatus, and for blocking rotation of said servo wheel upon detection of an anti-erase opening.

6. An apparatus as claimed in claim 2, characterized in that said drive means comprises a motor, and said apparatus comprises a microprocessor for controlling said motor, said switch being electrically connected to said microprocessor, and said microprocessor controlling said motor such that after said switch has been actuated there is a given time delay following which said motor is stopped, the continued operation of said motor moving said servo wheel to a position in which the switch is latched in a final switch position by the spring load exerted by said limbs.

7. An apparatus as claimed in claim 6, for recording information upon magnetic tape contained in a magnetic tape cassette, characterized in that said apparatus comprises means for sensing the presence or absence of an anti-erase opening in a cassette inserted in the apparatus, and for blocking rotation of said servo wheel upon detection of an anti-erase opening.

8. An apparatus as claimed in claim 1, characterized by comprising a spindle having an end portion, said spindle being rigidly connected to said coupling wheel, and means for applying an axial spring force to said spindle for urging said spindle axially against said guideway.

9. An apparatus as claimed in claim 8, characterized in that said drive means comprises a motor, and said apparatus comprises a microprocessor for controlling said motor, said switch being electrically connected to said microprocessor, and said microprocessing controlling said motor such that after said switch has been actuated there is a given time delay following which said motor is stopped, the continued operation of said motor moving said servo wheel to a position in which the switch is latched in a final switch position by the spring load exerted by said limbs.

10. An apparatus as claimed in claim 8, for recording information upon magnetic tape contained in a magnetic tape cassette, characterized in that said apparatus comprises means for sensing the presence or absence of an anti-erase opening in a cassette inserted in the apparatus, and for blocking rotation of said servo wheel upon detection of an anti-erase opening.

11. An apparatus as claimed in claim 1, for recording information upon magnetic tape contained in a magnetic tape cassette, characterized in that said apparatus comprises means for sensing the presence or absence of an anti-erase opening in a cassette inserted in the apparatus, and for blocking rotation of said servo wheel upon detection of an anti-erase opening.

* * * * *